United States Patent

Hudimac

[11] Patent Number: 5,509,214
[45] Date of Patent: Apr. 23, 1996

[54] MACHINE-SET MODULAR-FIXTURING SYSTEM

[75] Inventor: Paul V. Hudimac, North Wales, Pa.

[73] Assignee: Mechanical Service Co., Inc., Allentown, Pa.

[21] Appl. No.: 175,638

[22] Filed: Dec. 30, 1993

[51] Int. Cl.⁶ ............ B27G 23/00; B23Q 17/22
[52] U.S. Cl. ............ 33/642; 33/626; 33/573; 29/559
[58] Field of Search ............ 33/642, 626, 644, 33/645, 567, 567.1, 573, 568; 29/559

[56] References Cited

U.S. PATENT DOCUMENTS

| | | | |
|---|---|---|---|
| 2,808,654 | 10/1957 | Long | 33/613 |
| 3,229,365 | 1/1966 | Fisher et al. | 29/559 |
| 3,286,354 | 11/1966 | Richter | 33/567 X |
| 4,255,056 | 3/1981 | Peterson | 33/626 |
| 4,538,355 | 9/1985 | Morghen | 33/613 |
| 4,593,450 | 6/1986 | Dumire | 29/559 |
| 4,961,268 | 10/1990 | Xu et al. | 33/568 |
| 5,107,599 | 4/1992 | Marincic et al. | 33/573 |

FOREIGN PATENT DOCUMENTS

| | | | |
|---|---|---|---|
| 1036903 | 7/1966 | United Kingdom | 33/568 |
| 1215583 | 12/1970 | United Kingdom | 33/642 |

OTHER PUBLICATIONS

Carr Lane Manufacturing Co., Inc., Component Parts of Jigs and Fixtures, 1992, pp. 1MF, 4MF, 5MF, 16MF, 32MF.
Blüco Technik, Modular Fixturing System, Parts Catalog May 1988, pp. 4, 6, 38.
QV–CO, Modular Fixturing System, LIT Nov. 1992 QC, Catalog, 2, pp. 8, 9, 13, 26, 28 (date unknown).
Stevens Engineering, Inc., Modular Tooling System, Catalog 15M/490, pp. 5, 24, 25, 27 (date unknown).
Tecnara, Modular Jig and Fixture System 64, Catalogue No. 10T200–587, pp. 3, 4, back cover (date unknown).
Halder Norm & Technik, Halder Standard Parts, edition Jan. 1989, pp. 82, 83, back cover.

*Primary Examiner*—Christopher W. Fulton

[57] ABSTRACT

A modular-fixturing system utilizing machine-tool coordinate precision extended through a locating tool positioned within a machine-tool spindle nose, to accurately locate and position modular-fixturing components upon a baseplate.

13 Claims, 13 Drawing Sheets

MACHINE-SET MODULAR-FIXTURING SYSTEM

BACKGROUND—FIELD OF INVENTION

This invention relates in general to modular-fixturing systems and, more specifically, to an improved embodiment and method of constructing modular-fixtures for work holding in manufacturing processes.

BACKGROUND—DESCRIPTION OF PRIOR ART

Holding a workpiece for machining, forming, assembly and inspection operations is a universal problem encountered in all areas of manufacturing. To provide specific work holding solutions, three primary types of work holders may be employed.

The first type are those of general-purpose work holders, which are the simplest and most economical forms of work holding devices, such as: vises, chucks and table-mounted clamps. The second type are those of modular-fixturing work holders, which are temporary fixtures assembled from off-the-shelf, reusable components. The third type are those of permanent or dedicated work holders, which are the most expensive and detailed forms of fixturing specially machined to suit a specific workpiece.

Modular-fixturing links the best attributes of general-purpose work holding with permanent fixturing methods by producing special-purpose work holders assembled from general-purpose components. Three basic embodiments of modular fixturing exist, all of which include a primary referencing and structural element, the tool body or baseplate, and complementary workpiece locating and clamping elements. Within all three embodiments, the baseplate encompasses a regular array of equally spaced, identical precision features which mate directly or indirectly with corresponding precision features in the fixture components. The types of features, which constitute the array or grid-pattern include the following: alternating-precision bores and threaded holes, compound-precision bored and threaded holes, and precision T Slots. Fixturing elements are built to hold a specific workpiece by choosing and affixing the appropriate components onto the baseplate at suitable locations within the restrictions of the array. The alternating-precision bore and threaded hole type of grid-pattern currently manufactured by Stevens Engineering, Inc., Qu-Co, and Bluco Technik, uses the precision bores in conjunction with closely-fitting pins to establish locating points, while using the threaded holes to affix the components. This bore-hole grid-pattern severely limits possible locating and positioning options. The compound-precision bore and threaded hole type of grid-pattern currently manufactured by Carr Lane Manufacturing Co., has the flexibility to use each compound bore-threaded hole as either a locating point or as an affixing hole for components; however, a special precision locating screw is needed to do so. The precision T Slot type of grid-pattern; currently manufactured by Tec Nara and Halder Norm+Technik, is limited to using only T Slot intersections as locating points, even through such intersections are weak points of the baseplate.

Further disadvantages common to all three basic embodiments of modular-fixturing are the following:

(a) Precision locaters are needed to align the baseplate's grid-pattern reference frame with the machine tool's coordinate system reference frame. Some amount of error in this alignment is inevitable.

(b) When positioning workpiece locating elements, a complete dependence is placed upon the manufactured precision of the following baseplate characteristics: the flatness; ie. all points on the top surface of the baseplate must closely approximate a single plane, the parallelism; ie. the baseplate's top surface must ultimately be parallel to the machine tool's X–Y axis, and the array; ie. the position and size of the grid-pattern's precision features. As a result, this dependence causes the baseplate to be the most expensive component within the modular-fixturing system.

(c) Stacking-up of modular-fixturing components to position such components at a higher elevation, causes an accumulation of error between the modular-fixturing system and the machine tool.

(d) Positioning of workpiece locating and clamping elements is limited by the features constituting the array; ie. the locations of the alternating-precision bores and threaded holes, the compound-precision bored and threaded holes, and the precision T Slots.

(e) The machine tool is being utilized in a manner limiting its flexibility.

(f) The close-fit mating characteristic of locating elements causes difficulty when assembling and disassembling such elements, and in many cases requires the aid of special extractor tools.

A way of eliminating the disadvantages, common to all three basic embodiments of modular fixturing, is to use the machine tool and its inherently accurate coordinate system reference frame to position workpiece locating and clamping elements. U.S. Pat. No. 4,593,450 to Dumire (1986) discloses a method of using the machine tool to position locater bushings within tooling plates used to position circuit boards. Although this method eliminates the dependence upon precision made tooling plates, the locater bushings narrow the possible number of locating points available on the tooling plate, and also must be disassembled after each use to replace an integral locking member. U.S. Pat. No. 3,229,365 to Fisher and Erikson (1966) discloses a method of locating and positioning workpieces by using the machine tool to machine precision locating surfaces upon the heads of adjustable support screws. Although this method eliminates the dependence upon precision made tooling plates and workpiece locating elements, the adjustable support screws are not reuseable and must be re-machined for each new workpiece.

OBJECTS AND ADVANTAGES

Several objects and advantages of the present invention are:

(a) to provide a modular-fixturing embodiment which eliminates the need to accurately align the baseplate's grid-pattern reference frame with the machine tool's coordinate system reference frame;

(b) to provide a modular-fixturing embodiment which eliminates the complete dependence upon the manufactured precision of the baseplate, resulting in the use of an inexpensive baseplate;

(c) to provide a modular-fixturing embodiment with positional accuracy independent of elevation off the baseplate; thus permitting the stacking-up of modular-fixturing components free of error accumulation;

(d) to provide a modular-fixturing embodiment whose baseplate features do not limit the number of positioning and affixing locations possible for workpiece locating and clamping elements;

(e) to provide a modular-fixturing embodiment which allows the machine tool to be used for another function;

(f) to provide a modular-fixturing embodiment which facilitates easy assembly and disassembly of locating and clamping elements unaided by special extractor tools; and (g) to provide a modular-fixturing embodiment which is capable of locating in the Z-axis coordinate.

Further objects and advantages are to provide a modular-fixturing embodiment which utilizes a relatively inexpensive baseplate that does not limit the possible number of positioning and affixing locations for workpiece locating and clamping elements, which does not have the baseplate as the primary reference element; therefore, eliminating the need to align the baseplate's grid-pattern with the machine tool's coordinate system reference frame, which does not depend upon the baseplate's manufactured precision, which has coordinate positional accuracy independent of the elevation off the baseplate, which provides easy assembly and disassembly of locating and clamping elements, which provides a baseplate without weak points such as those occurring at T Slot intersections, and which uses the machine tool in a function other than that of machining. Still further objects and advantages will become apparent from consideration of the ensuing description and drawings.

DRAWING FIGURES

In the drawings, primed characters are used to show the alternate position of elements within the same preferred embodiment application.

REFERENCE NUMERALS IN DRAWINGS 20 machine-tool spindle nose
22 locating tool
24 baseplate
26 top surface
28 counterbore
30 threaded hole
32 retention knob
34 tapered shank
36 v-flange
38 wrench clearance slot
40 tool nose
42 external pilot
44 internal pilot
46 end-referencing surface
48 wrench
50 fastener
52 locating cylinder
54 precision counterbore
56 precision outer-diameter surface
58 non-critical clearance hole
60 multi-positional locater
62 slotted counterbore
64 precision dowel
66 edge locater
68 reference surface
70 precision bore
72 non-precision counterbore
74 locating tube
76 precision-outer diameter
78 non-precision inner diameter
80 support surface
82 threaded-adjustable support
84 jam nut

DESCRIPTION

Figure 1:
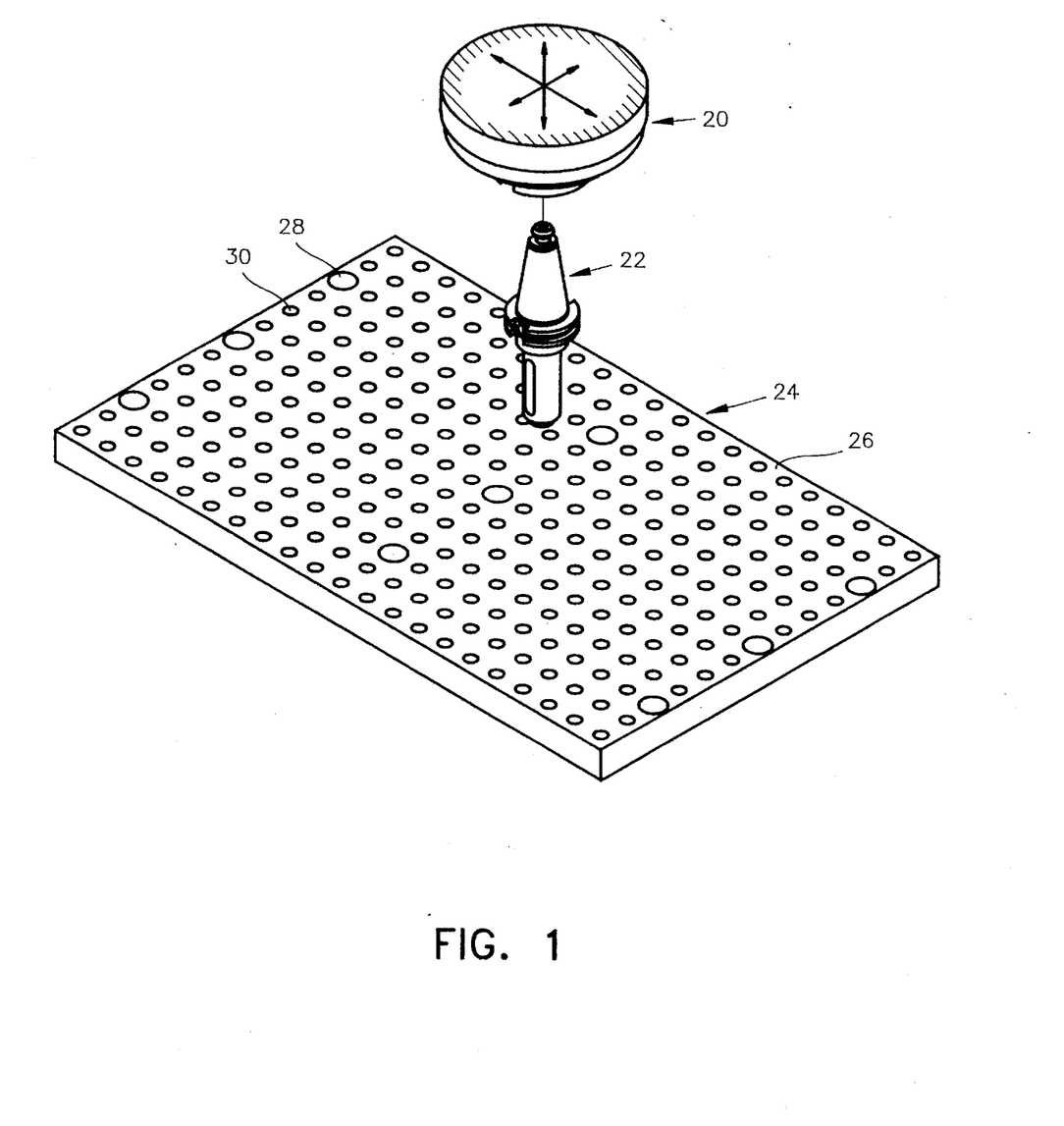
FIG. 1 is an exploded view illustrating the preferred embodiment of the invention.

Referring to FIG. 1, a preferred embodiment application of the machine-set modular-fixturing system includes a baseplate 24, a locating tool 22, and a machine-tool spindle nose 20. Machine-tool spindle nose 20 encompasses a conventional female-tapered bore (not shown). Baseplate 24 is preferably made of a rigid material with a uniform thickness, encompassing a multitude of threaded holes 30 in the form of a rectangular array. A counterbore 28 forms three equally spaced rows, one of which is centrally positioned on baseplate 24, while each of the other two are located along opposite ends of baseplate 24.

Figure 2:
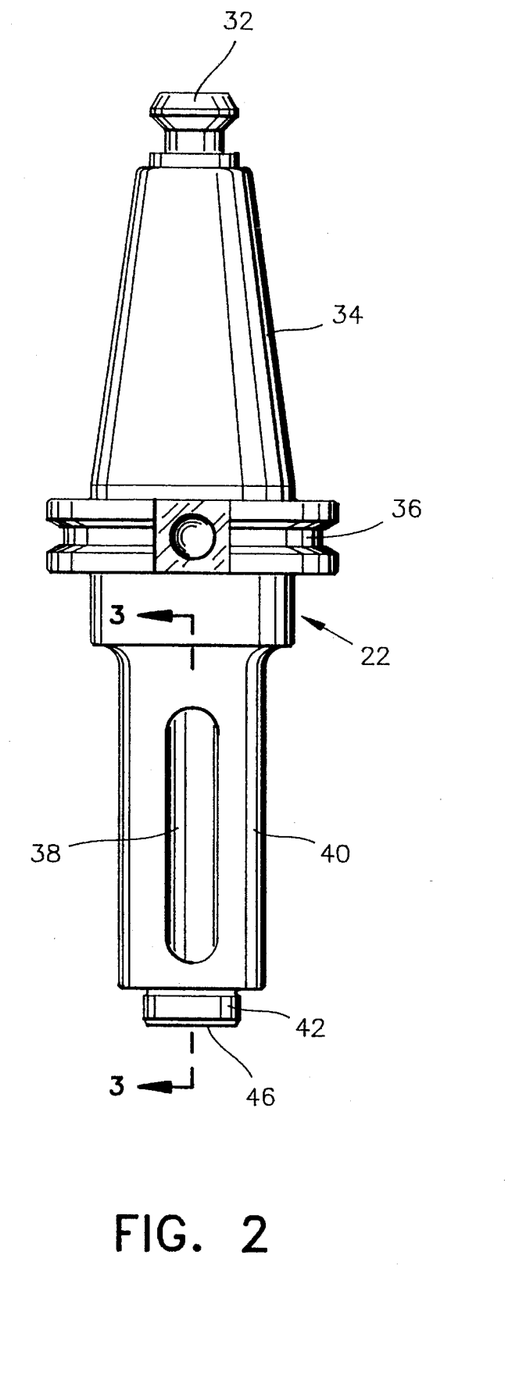
FIG. 2 is an elevation view showing the locating tool.

As shown in FIG. 2, locating tool 22 has a v-flange 36 interposing a tapered shank 34 and a tool nose 40. Tapered shank 34 terminates in a retention knob 32. Tapered shank 34, retention knob 32, and v-flange 36 of locating tool 22 are conventional elements commercially manufactured in a variety of forms according to American National Standards Institute rules, for use with different machine-tool spindle nose models. These features of locating tool 22 may be of another type provided that all are compatible with the preferred embodiment application of the machine-set modular-fixturing system. Tool nose 40 is of a cylindrical form having a wrench clearance slot 38 longitudinally positioned within its wall. Protruding from the base of tool nose 40 is an external pilot 42.

Figure 3:
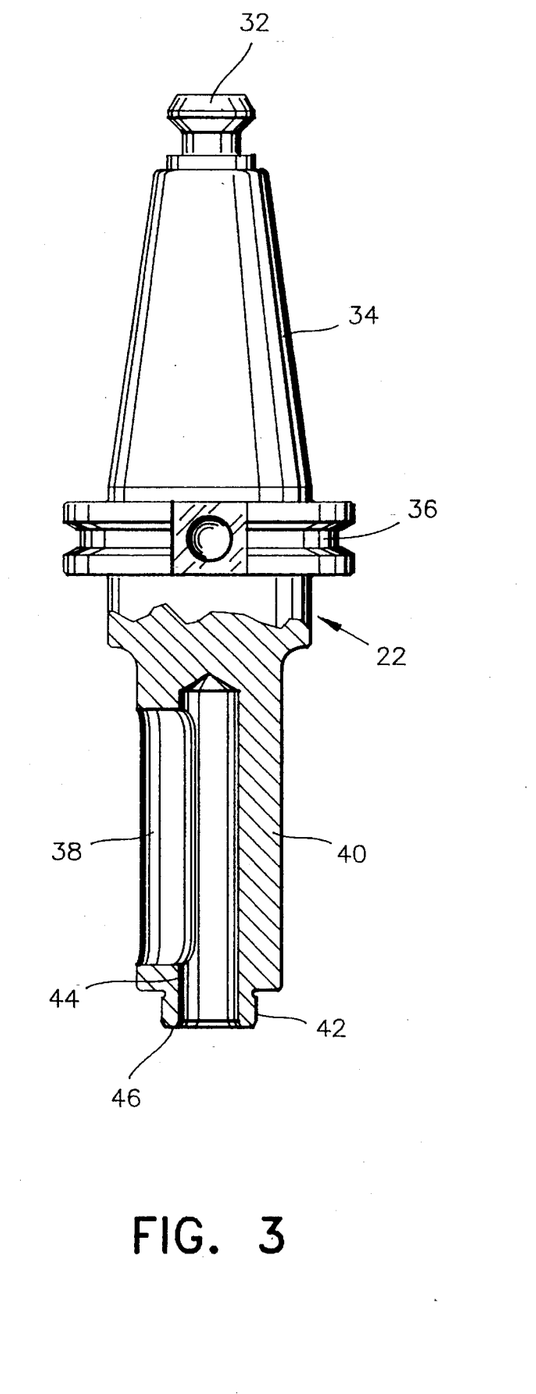
FIG. 3 is a fragmentary right-side elevation view taken at about line 3—3 of FIG. 2.

Referring to FIG. 3, an end-referencing surface 46 is formed on the lip of external pilot 42. The inside wall of external pilot 42 constitutes an internal pilot 44. External pilot 42, and internal pilot 44 dimensions and localities are coaxial with the central axis of tapered shank 34; and consequently to the machine-tool spindle when engaged therein. End-referencing surface 46 is perpendicular within a minute variation to the central axis of tapered shank 34.

Figure 4:
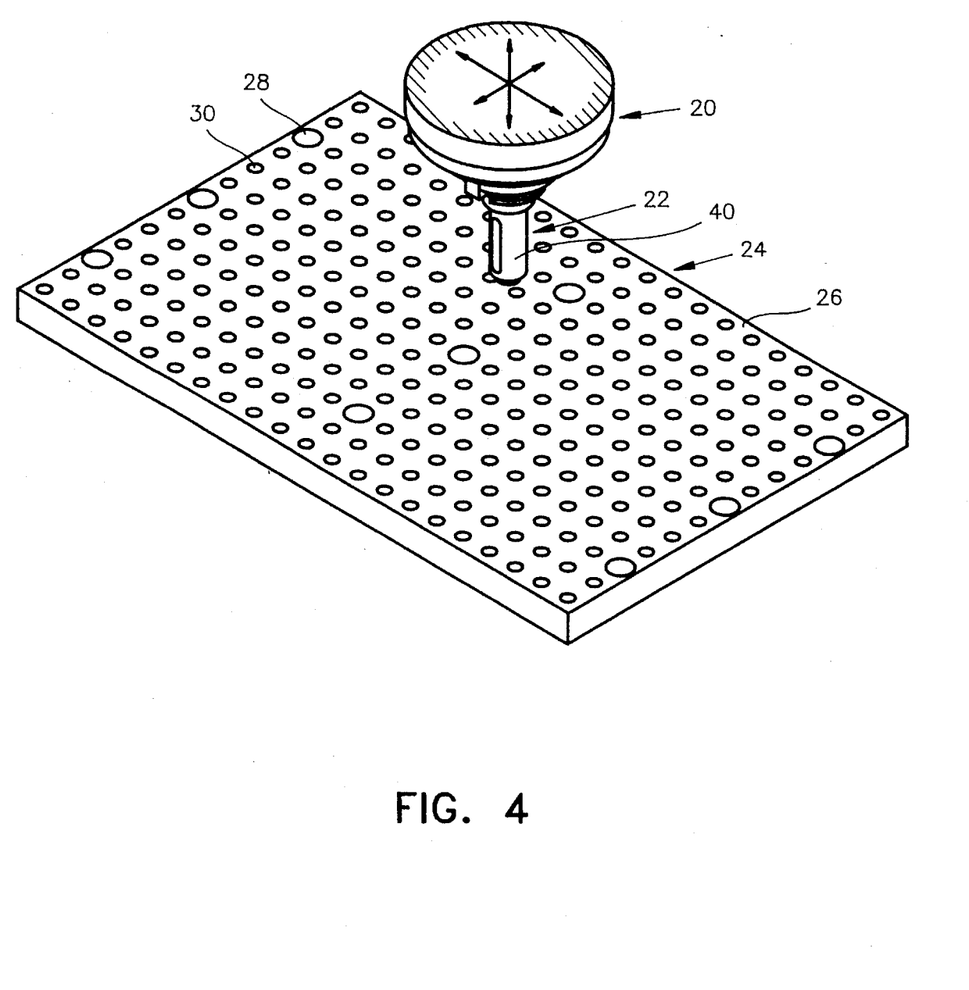
FIG. 4 is an isometric view showing the tapered shank positioned within the machine-tool spindle nose.

FIG. 4 shows tapered shank 34 (best shown in FIGS. 2 and 3) of locating tool 22, being situated within machine-tool spindle nose 20, exposing tool nose 40, all of which are suspended above baseplate 24.

Figure 5:
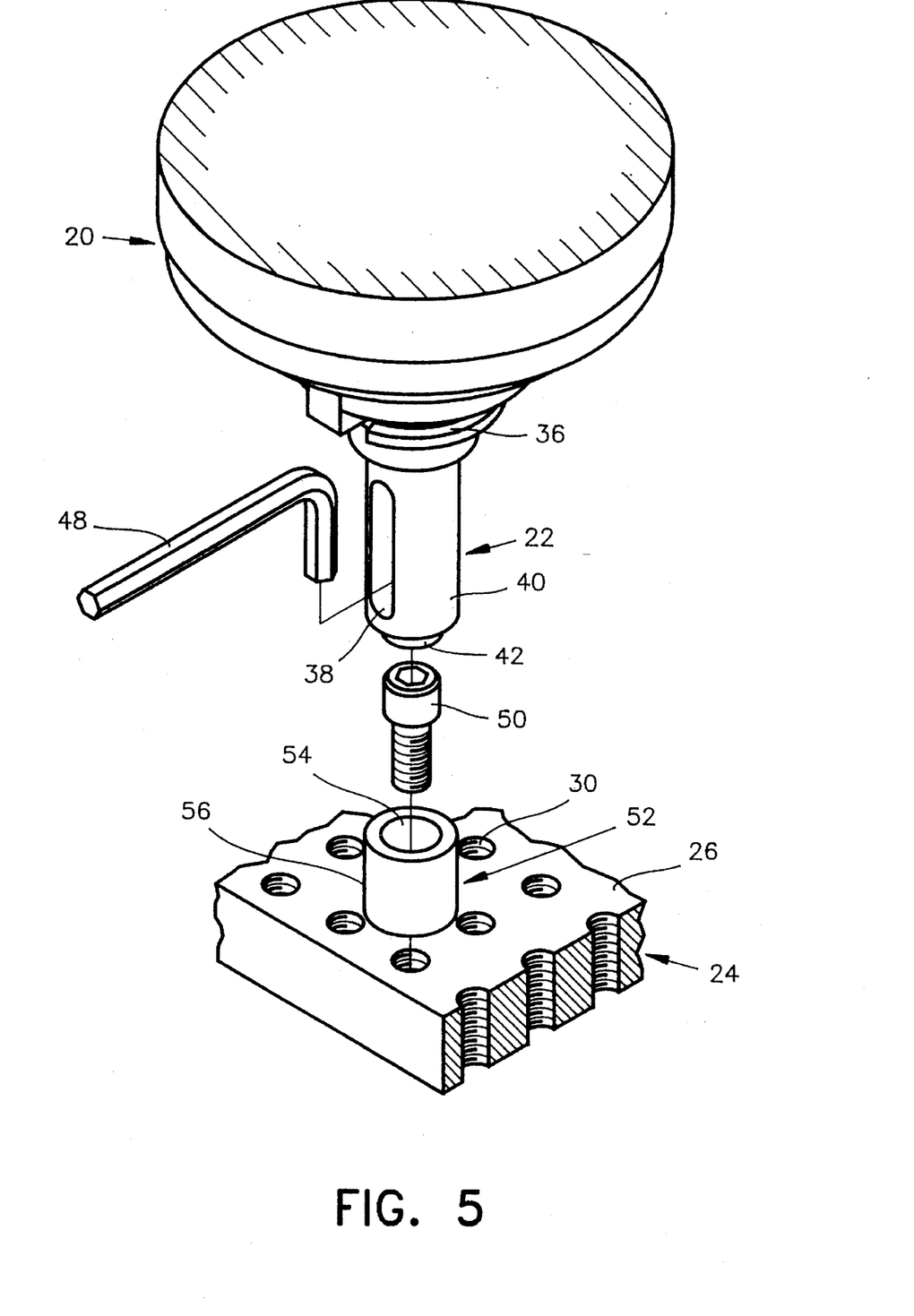
FIG. 5 is an exploded view showing the locating tool and the locating cylinder.

As shown in FIG. 5, in another preferred embodiment application of the machine-set modular-fixturing system, tapered shank 34 (best shown in FIGS. 2 and 3) of locating tool 22, is positioned within the conventional female-tapered bore (not shown) of the machine-tool spindle nose 20, exposing tool nose 40, all of which are suspended above a locating cylinder 52 and baseplate 24. Locating cylinder 52 is preferably made of a rigid material with a precision outer-diameter surface 56. A wrench 48 and a fastener 50, preferably of the hex-socket type, are commercially available from a plethora of manufacturers. However, wrench 48, fastener 50, and the upper members of locating tool 22 (best shown in FIGS. 2 and 3), may be of another type provided that all are compatible with the preferred embodiment application of the machine-set modular-fixturing system.

Figure 6:
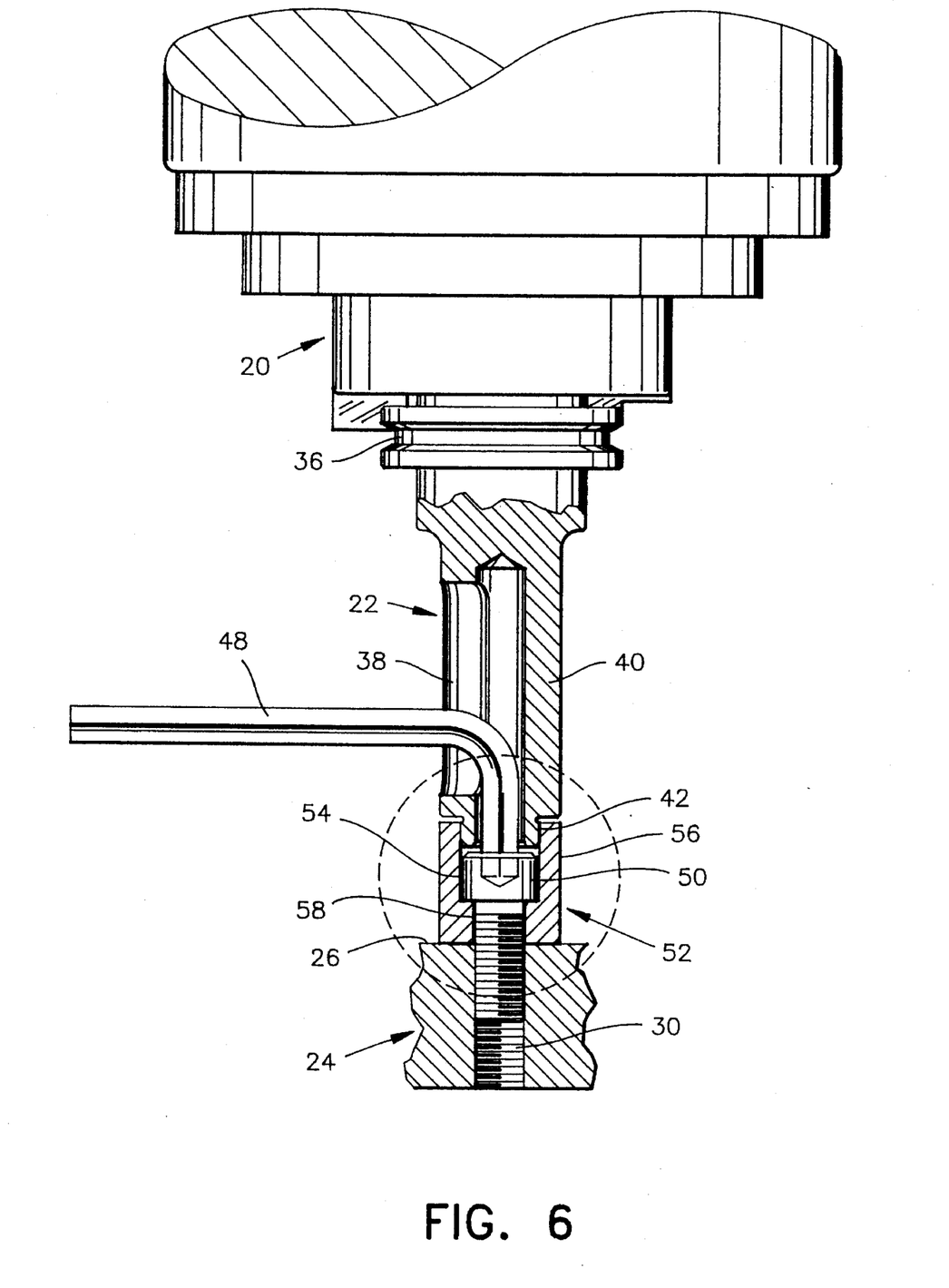
FIG. 6 is a fragmentary elevation view showing the external pilot of the locating pool positioned within the precision counterbore of the locating cylinder.

Referring to FIG. 6, the inner wall of locating cylinder 52 consists of a precision counterbore 54 above a non-critical clearance hole 58, both of which are concentric to the precision outer-diameter concentric 56. External pilot 42 of tool nose 40 is located within precision counterbore 54 of locating cylinder 52, and comes within a close proximity of fastener 50 which is positioned within threaded hole 30 of baseplate 24. Wrench 48 is positioned within the head of fastener 50, via wrench clearance slot 38.

Figure 7:
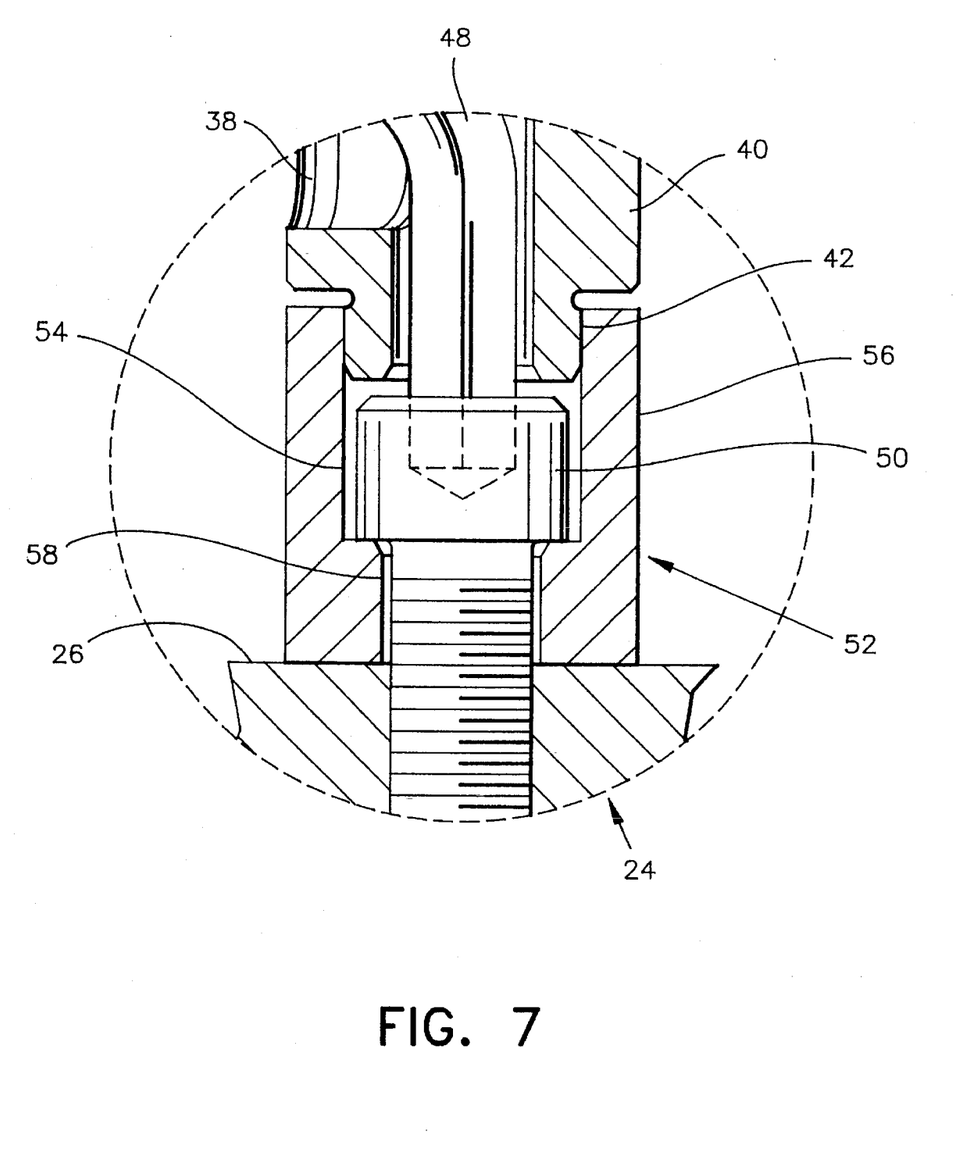
FIG. 7 is an enlarged view taken at about the broken-line encircled area of FIG. 6.

As shown in FIG. 7, clearance exists between fastener 50, and both precision counterbore 54 and non-critical clearance 58 of locating cylinder 52.

Figure 8:
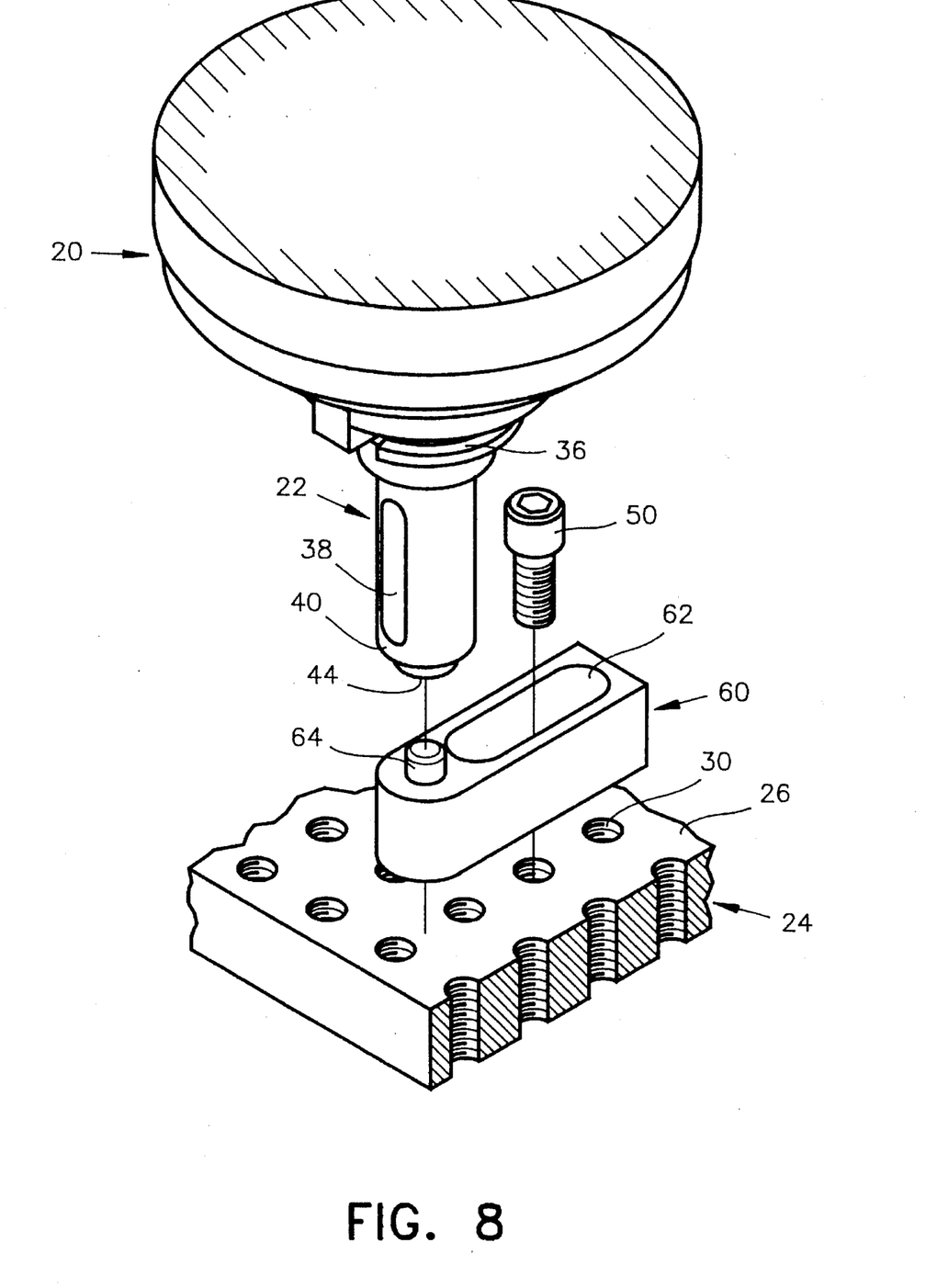
FIG. 8 is an exploded view showing the locating tool and the multi-positional locater.

FIG. 8 shows another preferred embodiment application of the machine-set modular-fixturing system, in which tapered shank 34, (best shown in FIGS. 2 and 3) of locating tool 22, is situated within the conventional female-tapered bore (not shown) of machine-tool spindle nose 20, exposing tool nose 40, all of which are suspended above a multi-positional locater 60 and baseplate 24. Multi-positional locater 60 is preferably made of a rigid material encompassing a slotted counterbore 62, and a precision dowel 64 which is press fit into multi-positional locater 60 via a conventional bore (not shown). Precision dowel 64 and fastener 50 are commercially available standard items compatible with the preferred embodiment application of the machine-set modular-fixturing system.

Figure 9:
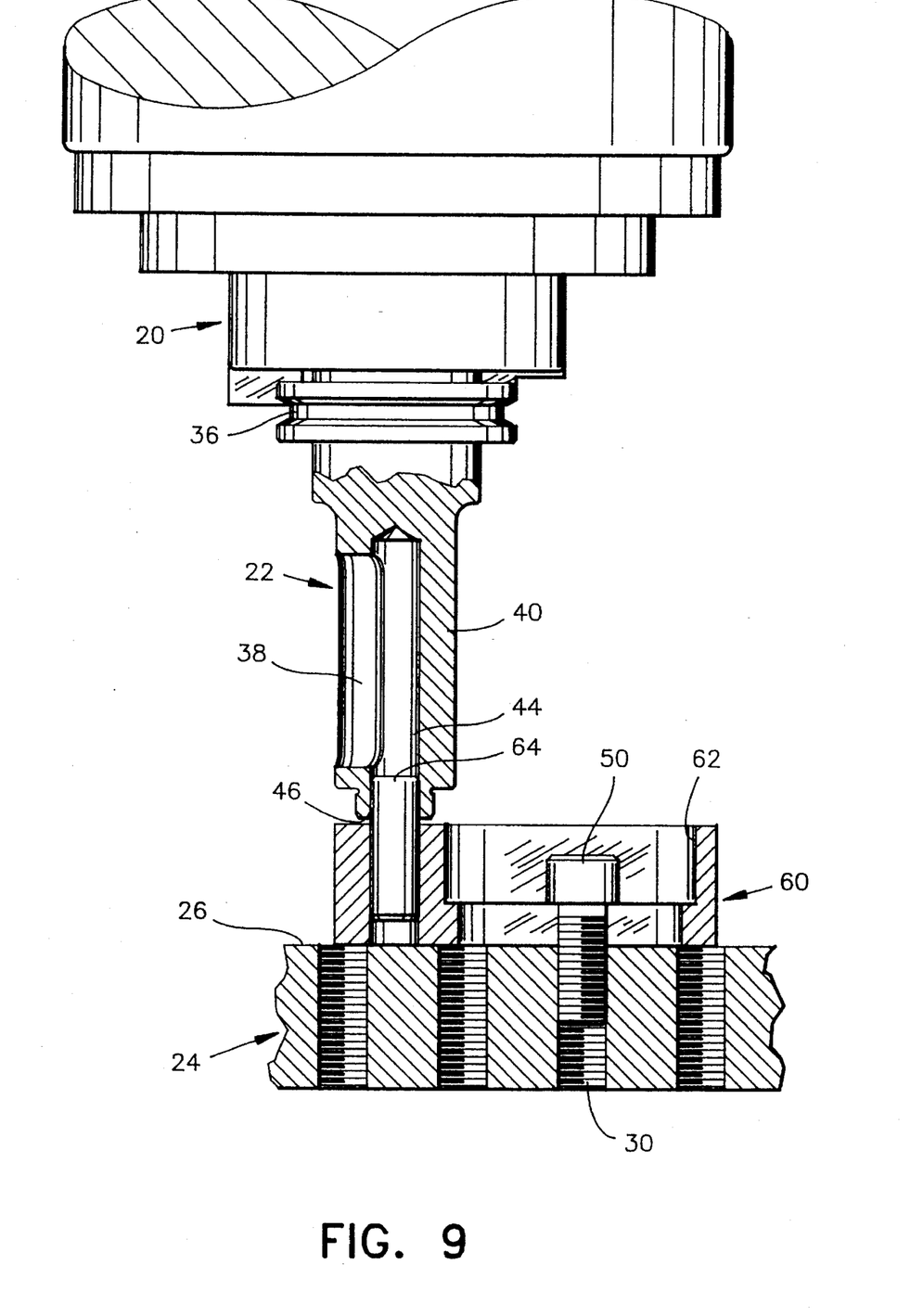
FIG. 9 is a fragmentary elevation view showing the precision dowel of the multi-positional locater positioned within the internal pilot of the locating tool.

Referring to FIG. 9, precision dowel 64 is positioned within internal pilot 44 of tool nose 40. End-referencing surface 46 of tool nose 40 comes within close proximity of the top surface surrounding precision dowel 64 of multi-positional locater 60. Fastener 50 is positioned within slotted counterbore 62 and threaded hole 30 of baseplate 24.

Figure 10:
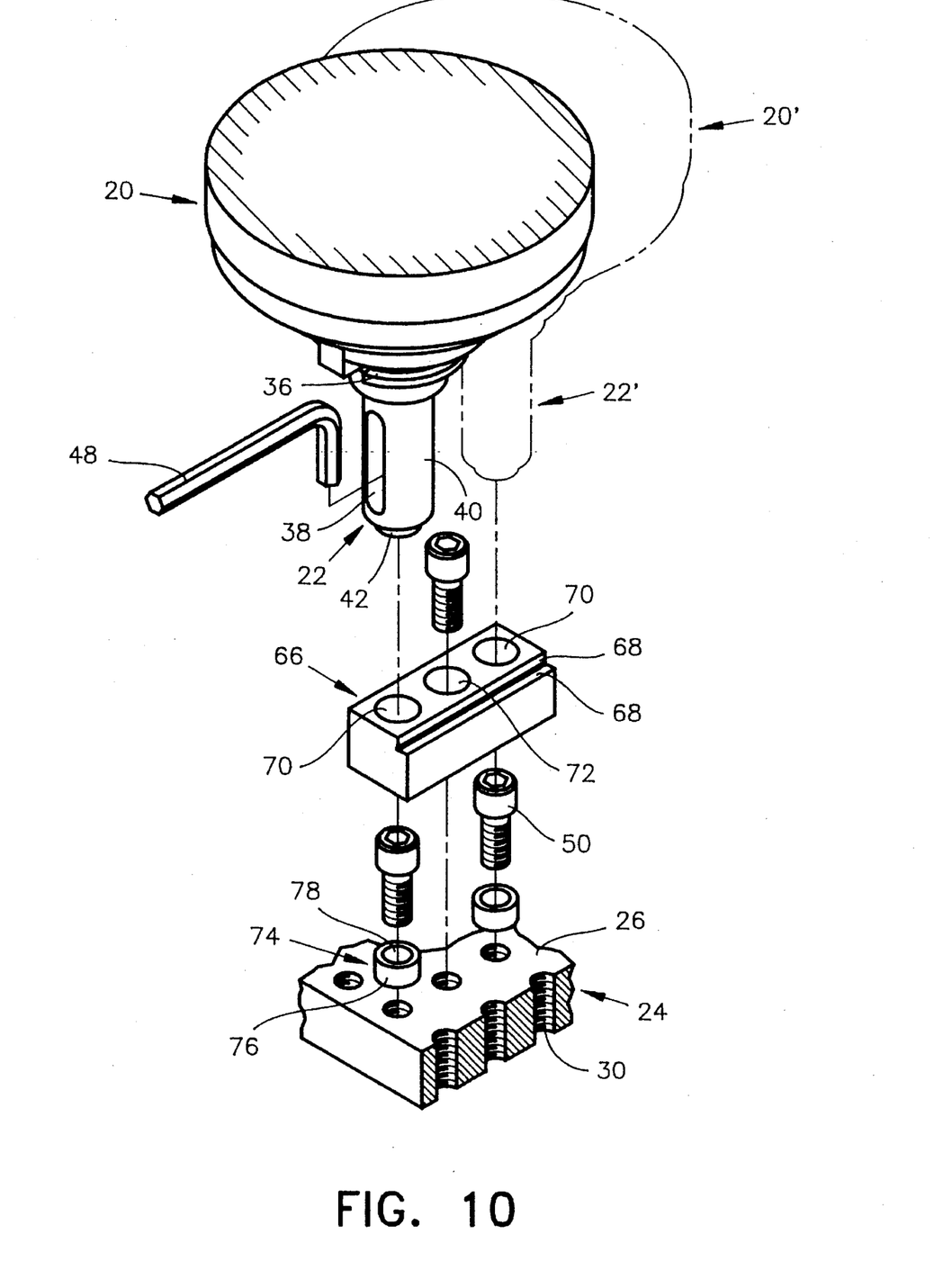
FIG. 10 is an exploded view showing the locating tool and the edge locater with its locating tubes.

As shown in FIG. 10, a preferred embodiment application of the machine-set modular-fixturing system includes tapered shank 34 (best shown in FIGS. 2 and 3) of locating tool 22, situated within the conventional female-tapered bore (not shown) of the machine-tool spindle nose 20, exposing tool nose 40, all of which are suspended above an edge locater 66, a pair of a locating tubes 74, and baseplate 24. Edge locater 66 is of a right-rectangular prismatic form preferably constructed from a rigid material, and consists of a non-precision counterbore 72 centrally located and interposing a precision bore 70 pair. A reference surface 68 is located lengthwise along one top edge of edge locater 66. Each locating tube 74 has a precision-outer diameter 76, and an inner wall composed of a non-precision inner diameter 78. Wrench 48 and fastener 50 are commercially available from a plethora of manufacturers. However, wrench 48, fastener 50, and upper members of locating tool 22 (best shown in FIGS. 2 and 3), may be of another type provided that all elements are compatible with the preferred embodiment application of the machine-set modular-fixturing system.

Figure 11:
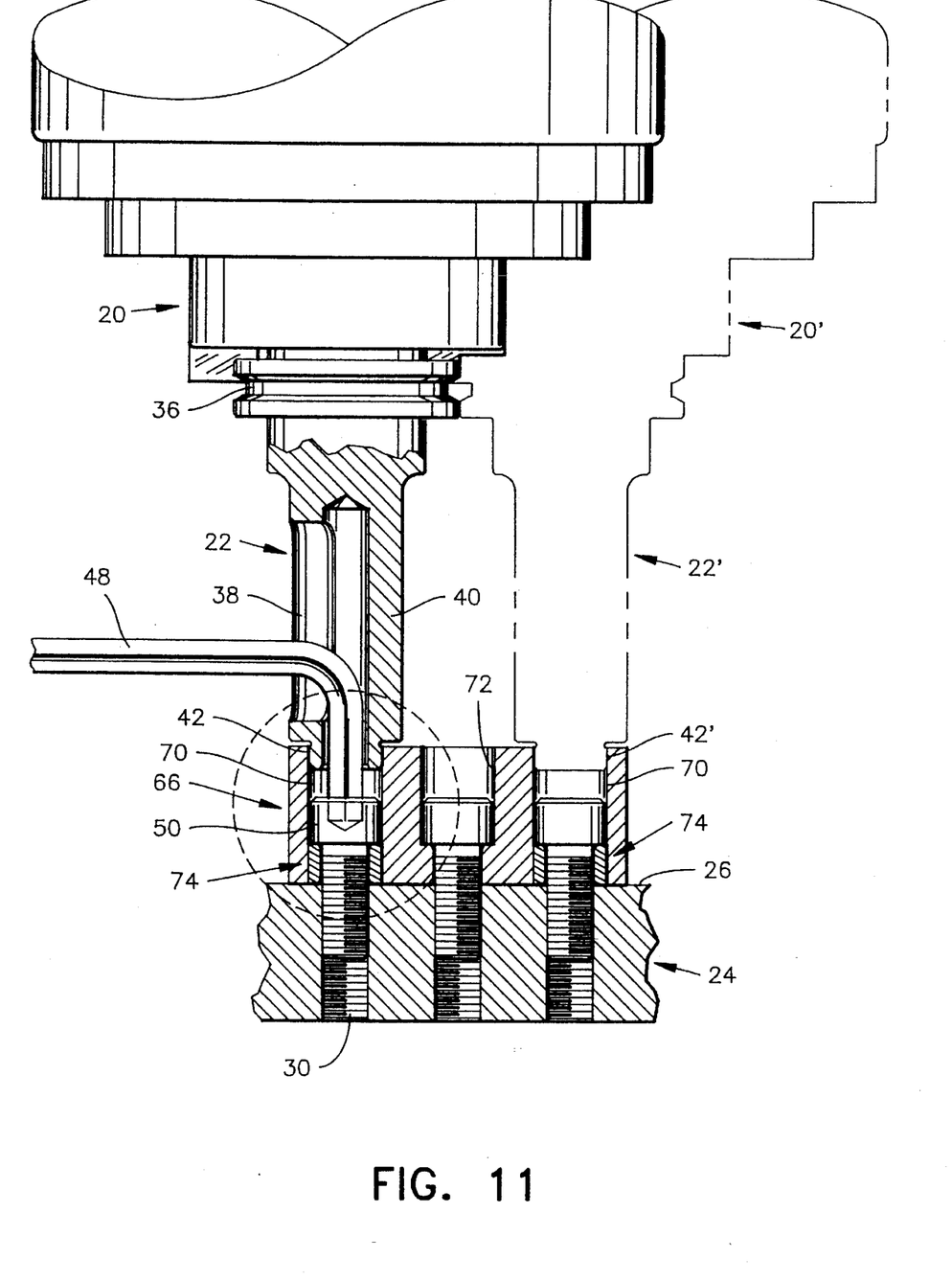
FIG. 11 is a fragmentary elevation view showing the external pilot of the locating tool positioned within one of the two precision bores of the edge locater.

FIG. 11 shows external pilot 42 of tool nose 40 situated within precision bore 70 of edge locater 66. Each locating tube 74 is positioned at the bottom end of each precision bore 70 located on both ends of edge locater 66. Fastener 50 is placed within each locating tube 74 and each corresponding threaded hole 30 of baseplate 24. The phantom line represents a second position of the preferred embodiment application of the machine-set modular-fixturing system, in which external pilot 42 of tool nose 40 is situated within precision bore 70 of edge locater 66. Non-precision counterbore 72 has fastener 50 placed within it extending inside threaded hole 30 of baseplate 24.

Figure 12:
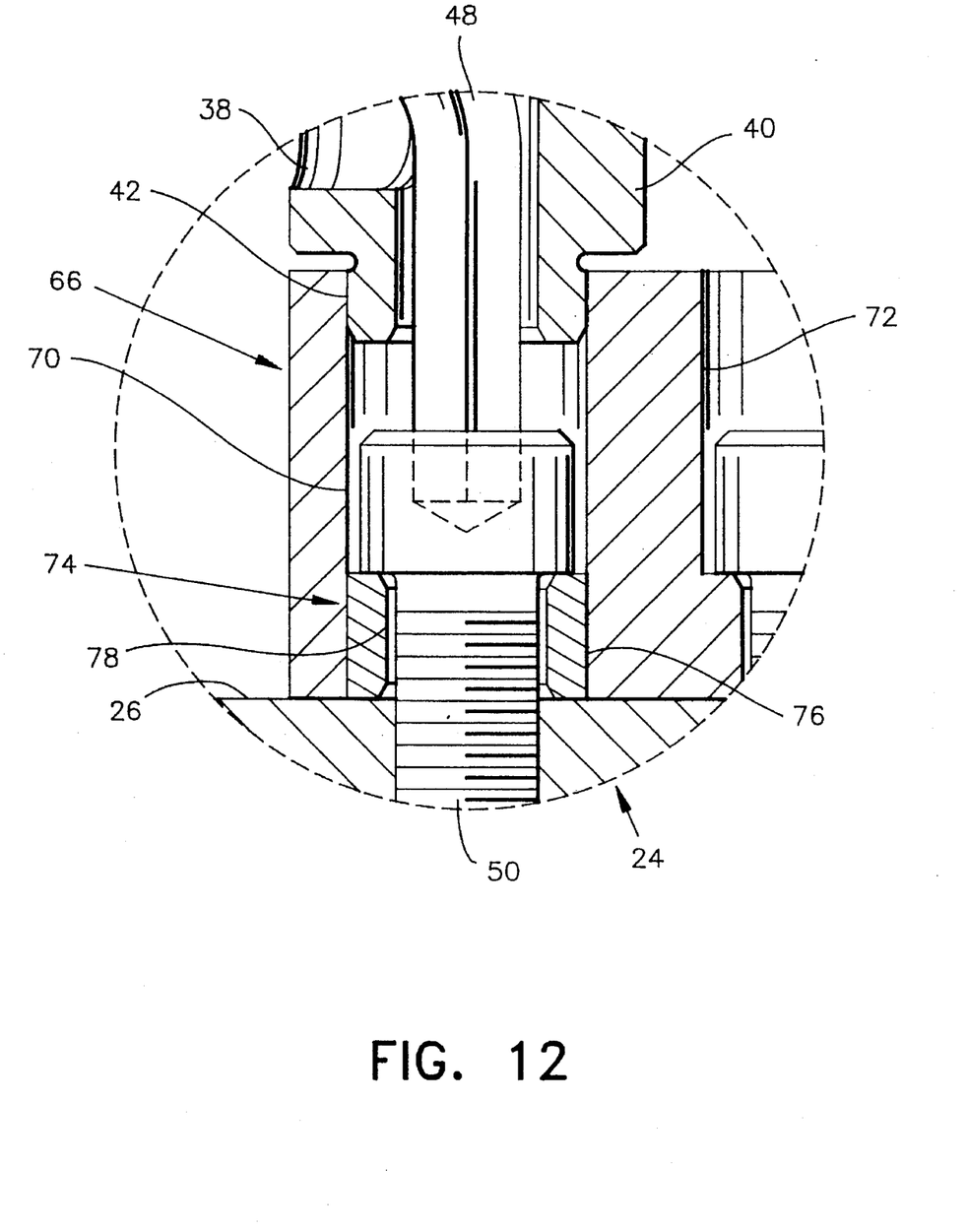
FIG. 12 is an enlarged view taken at about the broken-line encircled area of FIG. 11.

Referring to FIG. 12, the top end of wrench 48 is engaged in the head of fastener 50 via wrench clearance slot 38 of tool nose 40. Clearance exists between fastener 50, and both precision bore 70 and non-precision inner diameter 78.

Figure 13:
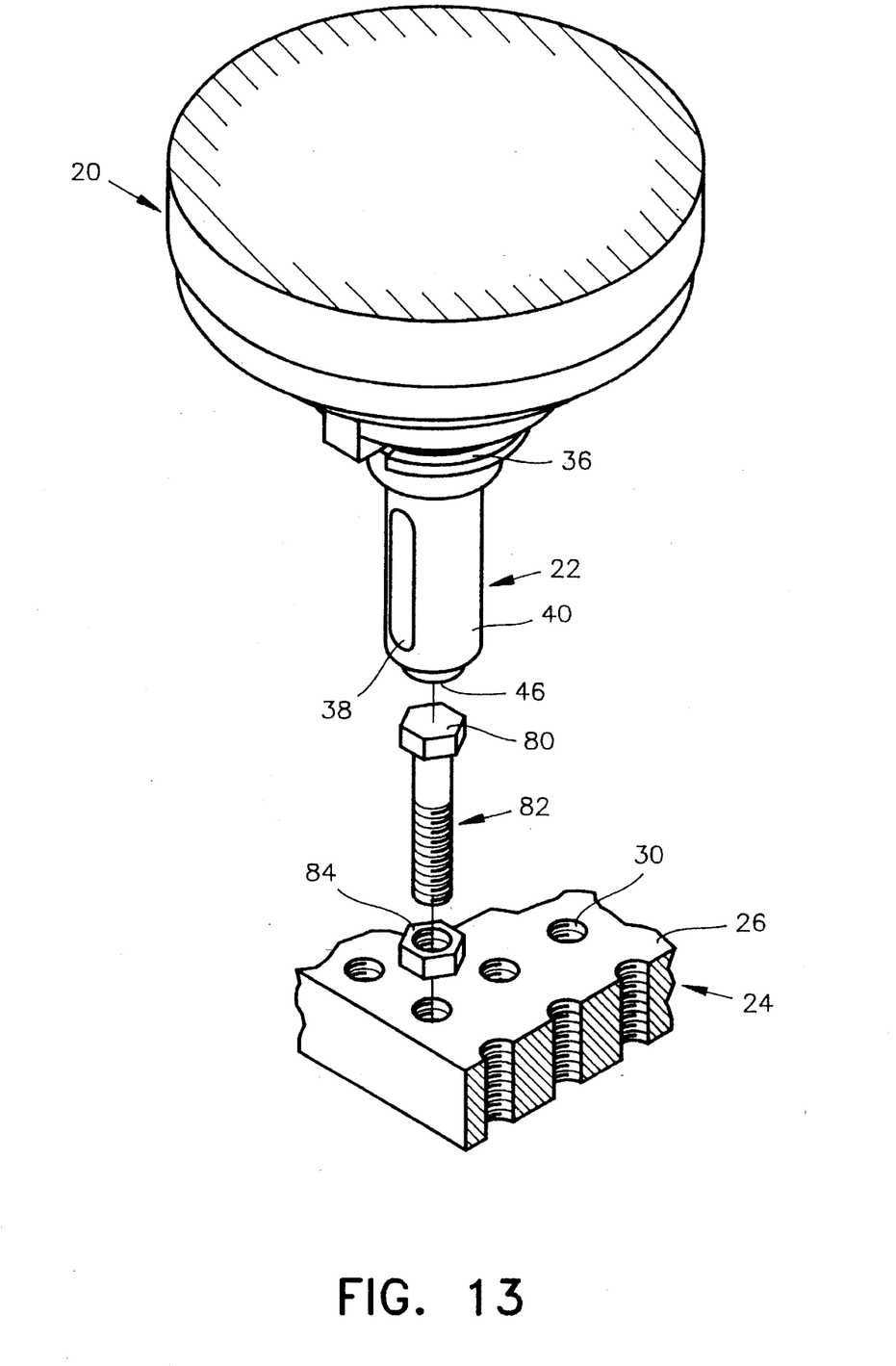
FIG. 13 is an exploded view showing the locating tool and the threaded-adjustable support.

FIG. 13 shows another preferred embodiment application of the machine-set modular-fixturing system, in which tapered shank 34 (best shown in FIGS. 2 and 3) of locating tool 22, is situated within the conventional female-tapered bore (not shown) of the machine-tool spindle nose 20, exposing tool nose 40, all of which are suspended above a threaded-adjustable support 82, a jam nut 84, and baseplate 24. Threaded-adjustable support 82 has a support surface 80 on its head. Jam nut 84 and threaded-adjustable support 82 are commercially available standard items compatible with the preferred embodiment application of the machine-set modular-fixturing system.

Figure 14:
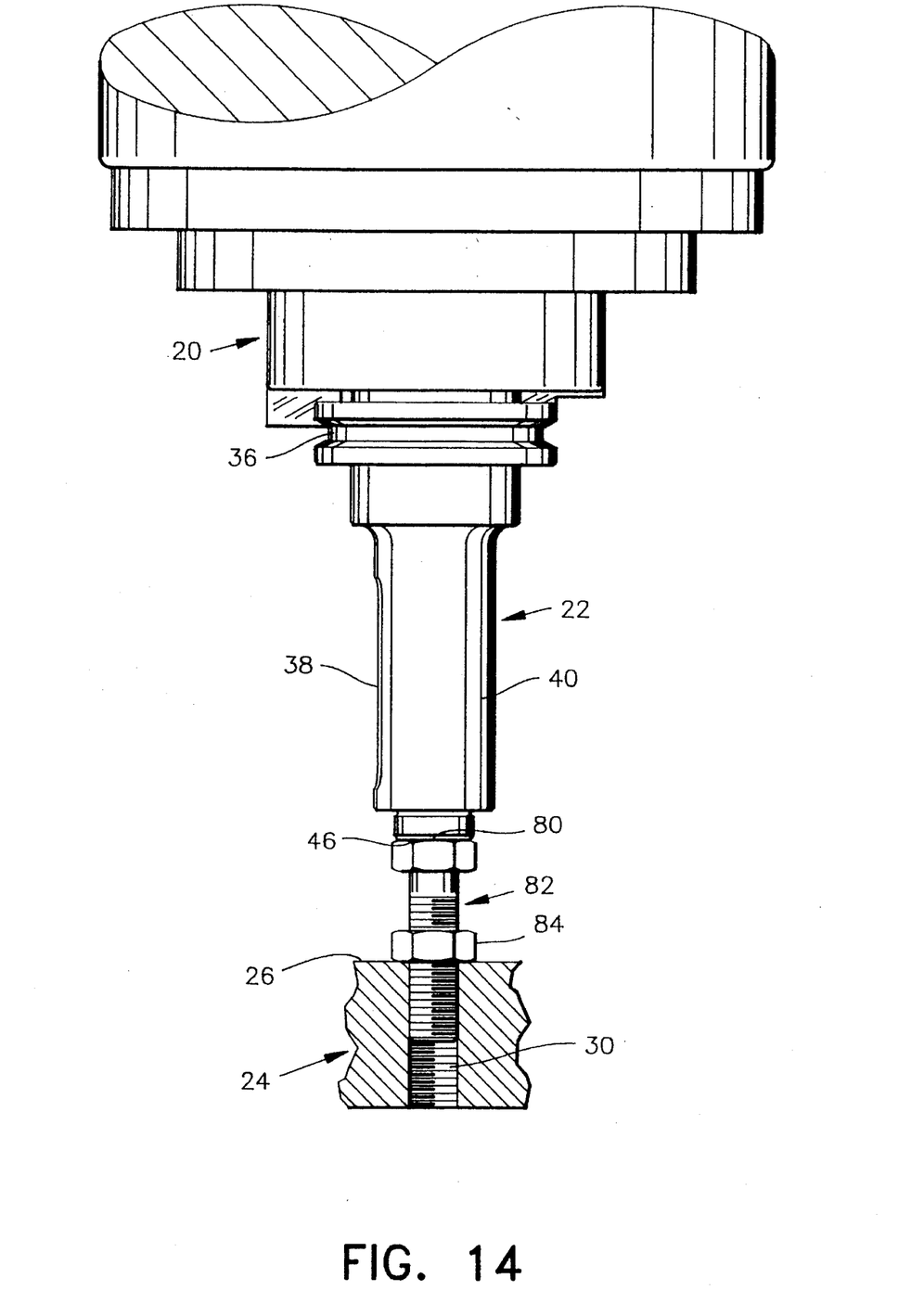
FIG. 14 is an elevation view showing the threaded-adjustable support abutting the end-referencing surface of the locating tool.

As shown in FIG. 14, end-referencing surface 46 of tool nose 40 abuts support surface 80 of threaded-adjustable support 82, which in turn is positioned within jam nut 84 and extends into the corresponding threaded hole 30 of baseplate 24.

From the description above, a number of advantages of the machine-set modular-fixturing system become evident:

(a) The locating tool utilized with the machine tool obviates both the need to accurately align the baseplate's grid-pattern with the machine tool's coordinate system, and the need of a precision manufactured baseplate.

(b) The end-referencing surface of the locating tool used in conjunction with the machine tool, permits setting of Z-axis workpiece reference surfaces.

(c) The use of commercially available fastening elements along with a locating tool aided by the machine tool, produces an unlimited number of positioning and affixing locations on the baseplate.

(d) The machine tool in union with the locating tool is used to locate positions on the baseplate, thus the machine tool is being used in a capacity beyond that of machining.

(e) Locating and clamping elements are easily assembled and disassembled due to the design and application of the various preferred embodiments of the machine-set modular-fixturing system.

OPERATION

The manner of using the machine-set modular-fixturing system begins with mounting the baseplate 24 to the machine-tool table by way of fasteners engaged in the three rows of counterbores 28 in the baseplate 24 (FIG. 1). Precision is derived from the machine tool's positioning capability and not from the baseplate 24; therefore, the orientation and position of the baseplate's grid of threaded holes 30 is not critical to the operation, and need only be in relative agreement with the machine tool's X–Y coordinate reference frame. The baseplate's grid of threaded holes 30 have a non-critical, non-locating function, and are used only to fasten and hold components in place on the baseplate 24. After mounting the baseplate 24 on the machine-tool table, the top surface 26 of the baseplate 24 is machined flat and parallel by the machine tool, thus ensuring that any component placed on the baseplate 24 is referenced in perfect agreement with the machine tool's horizontal X–Y coordinate plane.

The locating tool 22 is then placed into the machine-tool spindle nose 20 (FIG. 1). The retention know 32 and tapered shank 34 of the locating tool 22 (FIGS. 2 and 3) are drawn into and accurately mate the accommodating conventional female-tapered bore (not shown) of the machine-tool spindle nose 20, thus exposing the tool nose 40 (FIG. 4). The tool nose 40 is a necessary element for the execution of the locating and locking operation of the machine-set modular-fixturing system. The external pilot 42 center-line axis, internal pilot 44 center-line axis, and end-referencing surface 46 features of the tool nose 40 (FIGS. 2 and 3), accurately represent the three-dimensional position of the machine-tool spindle nose 20 (FIG. 4). When possible, the cathode ray tube (CRT) screen of the machine tool can be used to directly view the coordinate position of the locating tool 22.

As shown in FIG. 5, the machine-tool spindle nose 20 with the previously inserted locating tool 22 is moved to a desired X–Y location corresponding to one of the threaded holes 30 of the baseplate 24. To position the workpiece locating cylinder 52 a fastener 50 is engaged by hand into the threaded hole 30 loosely holding the locating cylinder 52 to the baseplate 24. The machine-tool spindle nose 20 is then moved so the external pilot 42 of the tool nose 40 is positioned within the closely fitting precision counterbore 54 of the locating cylinder 52 (FIG. 6). The center axis of the locating cylinder 52 is now coincident with the axis of the locating tool 22, and in turn with the machine-tool spindle nose 20. The locating cylinder 52 can float in any radial direction about the fastener 50 (FIG. 7), within the restrictions of the clearance gap existing between the fastener 50, and both the precision counterbore 54 and non-critical clearance hole 58 of the locating cylinder 52. The machine-tool spindle nose 20 is placed in a neutral mode. Wrench 48 is inserted through the wrench clearance slot 38 of the tool nose 40, then engaged with the head of fastener 50 (FIG. 6). Wrench 48 is turned to engage fastener 50 into the threaded hole 30 in the baseplate 24, and to affix the locating cylinder 52 into position. When possible, the CRT screen of the machine tool can be used to directly view the coordinate location of the locating cylinder 52.

Within the next preferred embodiment application of the machine-set modular-fixturing system (FIG. 8), the machine-tool spindle nose 20 is moved to the desired X–Y location anywhere on the baseplate 24, within the travel restrictions of the machine tool being utilized. The desired precision dowel 64 location does not have to correspond to a threaded hole 30 location on the baseplate 24. The machine-tool spindle nose 20 is moved so the precision dowel 64 of the multi-purpose locater 60 is situated within the internal pilot 44 of the tool nose 40 (FIG. 9). The multi-positional locater 60 is then pivoted about the precision dowel 64 until the desired threaded hole 30 is in clearance with the slotted counterbore 62. A fastener 50 is placed through the slotted counterbore 62 and engaged with the threaded hole 30 using a complementary conventional wrench, thus the multi-positional locater 60 is affixed to the baseplate 24 and the precision dowel 64 is locked into place. When possible, the CRT screen of the machine tool can be used to directly view the coordinate position of the precision dowel 64.

As shown in FIG. 10, another preferred embodiment application of the machine-set modular-fixturing system involves the machine-tool spindle nose 20 with the previously inserted locating tool 22 being moved to the desired X–Y location on the baseplate 24 corresponding with a threaded hole 30 position. The edge locater 66 is placed in an approximate position on the baseplate 24. One locating tube 74 is inserted into each of the precision bores 70 in the edge locater 66. Next, a fastener 50 is placed through each precision bore 70 and into each locating tube 74, engaging each of the corresponding threaded holes 30 of the baseplate 24. The edge locater 66 can float within the clearance that exists between the fastener 50, and both the precision bore 70 and the non-precision inner diameter 78 (FIG. 12). The machine-tool spindle nose 20 is lowered to position the external pilot 42 of the tool nose 40 into one of the precision bores 70 in the edge locater 66 (FIG. 11). Wrench 48 is inserted through the wrench clearance slot 38 of the tool nose 40, and then engaged with the head of the fastener 50. The machine-tool spindle nose 20 is placed in a neutral mode. The wrench 48 is used to turn the fastener 50, thus affixing the edge locater 66 as a concentric location on the baseplate 24. Another positioning point must be set to bring the workpiece referencing surfaces 68 of the edge locater 66 into parallel agreement with either the X or Y axis of the machine tool. Therefore, the machine-tool spindle nose 20 is raised to disengage the external pilot 42 of the tool nose 40 from the precision bore 70 of the edge locater 66. The machine-tool spindle nose 20 is only repositioned along one axis, either the X or Y, to a distance equal to the nominal spacing between the precision bores 70 of the edge locater 66 (FIG. 11). This second point defines a straight line parallel to either the X or Y axis as chosen, resulting in the workpiece reference surfaces 68 being parallel to the chosen axis. Again, the machine-tool spindle nose 20 is lowered so the external pilot 42 of the tool nose 40 is positioned within the available precision bore 70 of the edge locater 66. The machine-tool spindle nose 20 is placed in a neutral mode. A wrench 48 is inserted into the wrench clearance slot 38 of the tool nose 40, engaging the head of the fastener 50. The wrench 48 is used to turn the fastener 50, thus affixing the second point, ie. the radial-locating point. A third fastener 50 is placed into the non-precision counterbore 72 to positively seat the edge locater 66 against the top surface 26 of the baseplate 24. When possible, the CRT screen of the machine tool can be used to directly view the coordinate position of the workpiece referencing surfaces 68 of the edge locater 66.

FIG. 13 shows another preferred embodiment application of the machine-set modular-fixturing system, in which the machine-tool spindle nose 20 with the previously inserted locating tool 22 is positioned in an X–Y plane above a desired location on the baseplate 24. The threaded-adjustable support 82 is loosely screwed into the desired threaded hole 30 in the baseplate 24, leaving the jam nut 84 loose on the threaded-adjustable support 82. After properly referencing the end-referencing surface 46 of the tool nose 40 to the machine-tool coordinate system, commonly called setting the length offset, the machine-tool spindle nose 20 is lowered to the desired Z-elevation off the baseplate 24. When possible, the CRT screen of the machine tool can be used to directly view the Z-coordinate number. The displayed Z-coordinate corresponds to the distance between the top surface 26 of the baseplate 24 and the end-referencing surface 46 of the too nose 40. After the machine-tool spindle nose 20 is at the desired X–Y–Z location, the threaded-adjustable support 82 is unscrewed until the support surface 80 makes contact with the end-referencing surface 46 of the tool nose 40. The jam nut 84 is locked against the baseplate 24 by the use of a complementary conventional fastening tool, thus securing the distance between the support surface 80 of the threaded-adjustable support 82 and the top surface 26 of the baseplate 24.

SUMMARY, RAMIFICATIONS, AND SCOPE

Accordingly the reader will see that by utilizing the machine tool's inherent precision to locate components on the baseplate, the machine-set modular-fixturing system takes the machine tool to a realm beyond that of the previous paradigm, ie. using the machine tool for machining only. Also, this application of the machine tool's precision eliminates the need to accurately align the baseplate's grid-pattern with the machine tool's coordinate system, resulting in the use of an inexpensive baseplate completely independent of manufactured precision constraints. The Z-coordinate system produced by utilizing the machine tool's precision permits stacking-up of components free of accumulated error. In addition, the design of the various embodiment components along with the use of commercially available fastening elements, permits easy assembly and disassembly of locating and clamping components. Furthermore, the machine-set modular-fixturing system baseplate grid-pattern features produce an unlimited number of locating and positioning possibilities.

Although the description above contains many specificities, these should not be construed as limiting the scope of the invention but as merely providing illustrations of some of the presently preferred embodiment applications of the machine-set modular-fixturing system. For example, the machine-set modular-fixturing system may be utilized to build a variety of work holder types for manufacturing processes such as: welding, drilling, inspection, assembly, forming, wire-harnessing, and the breadboarding of mechanical devices.

Thus the scope of the machine-set modular-fixturing system should be determined by the appended claims and their legal equivalents, rather than by the examples given.

I claim:

1. A fixture building system to accurately position and fasten fixturing elements relative to an employed machine's coordinate reference frame, comprising: a fixed flat mounting surface, a locating tool, a machine tool spindle, and said fixturing elements, said locating tool is of tubular form having a tapered shank located at its upper portion, a cylindrical elongation concentrically extending from the base of said shank, and a cannular protrusion concentrically positioned and projecting from the base of said elongation, and said locating tool is carried in said machine tool spindle of said employed machine, an internal pilot diameter, an external pilot diameter, and an end-referencing surface forming said cannular protrusion are in perfect orientation to the coordinate reference frame of the employed machine, thus, by virtue of mating said internal pilot diameter, said external pilot diameter, or said end-referencing surface with said fixturing elements and fastening said fixturing element in this location, the said locating tool can position and fasten said fixturing element on said fixed flat mounting surface relative to said employed machine's coordinate reference frame.

2. The fixture building system of claim 1, wherein said mounting surface comprises a regular pattern of threaded holes therein.

3. The fixture building system of claim 1, wherein said fixturing elements comprise at least one counterbore or slot sized to receive a complementary sized hex socket head cap screw.

4. The fixture building system of claim 1, wherein said shank comprises conventional features manufactured according to American National Standards Institute Rules ANSI/AMSE B5.50-1985 to render inception and carry of said tool by said employed machine.

5. The fixture building system of claim 1, wherein said elongation comprises a central bore with a designated inside dimensioned cavity wall concentric to said shank and said protrusion.

6. The fixture building system of claim 5, wherein said wall encompasses a longitudinally positioned slot perpendicularly oriented relative to the axis of said elongation and dimensioned to receive a complementary configured wrench.

7. The fixturing building system of claim 6, wherein said wrench is of a standard configuration encompassing a hex key so as to be capable of engagement with the hex socket head of said screw.

8. The fixture building system of claim 1, wherein said internal pilot diameter is of a precise dimension; concentrically oriented relative to said external pilot diameter, said elongation, and said shank.

9. The fixture building system of claim 8, wherein said internal pilot diameter is sized so as to be capable of receiving fixturing elements encompassing a complementary sized outer dimensioned diameter.

10. The fixture building system of claim 1, wherein said external pilot is of a precise dimension; concentrically oriented relative to said internal pilot diameter, said elongation, and said shank.

11. The fixture building system of claim 10, wherein said external pilot diameter is sized so as to be capable of being inserted into fixturing elements encompassing a complementary sized precision bore or counterbore.

12. The fixture building system of claim 1, wherein said end-referencing surface is precision ground constituting perpendicular orientation to the axis of said elongation, and said shank.

13. The fixture building system of claim 12, wherein said surface is ground so as to be capable of precisely abutting fixturing elements encompassing an adjustable precision ground surface.

* * * * *

UNITED STATES PATENT AND TRADEMARK OFFICE
CERTIFICATE OF CORRECTION

PATENT NO. : 5,509,214
DATED : Apri 23, 1996
INVENTOR(S) : Paul V. Hudimac

It is certified that error appears in the above-indentified patent and that said Letters Patent is hereby corrected as shown below:

Col. 5, line 33, line 22, change "outer-diameter concentric 56" to - outer-diameter surface 56 -.
Col. 5. line 40, line 7, change "non-critical clearance 58" to - non-critical clearance hole 58 -.
Col. 8, line 9, line 9, change "multi-purpose locater 60" to - multi-positional locater 60 -.

Signed and Sealed this

Third Day of December, 1996

Attest:

BRUCE LEHMAN

Attesting Officer    Commissioner of Patents and Trademarks